US011532976B2

(12) United States Patent
Desai et al.

(10) Patent No.: US 11,532,976 B2
(45) Date of Patent: Dec. 20, 2022

(54) REDUCED NOISE AND VIBRATION SWITCHED RELUCTANCE MACHINE

(71) Applicant: Software Motor Company, Sunnyvale, CA (US)

(72) Inventors: Piyush Desai, Des Plaines, IL (US); Tim Knodel, Cupertino, CA (US); Bryan Knodel, Flagstaff, AZ (US); Earl Fairall, Sunnyvale, CA (US)

(*) Notice: Subject to any disclaimer, the term of this patent is extended or adjusted under 35 U.S.C. 154(b) by 94 days.

(21) Appl. No.: 16/635,986

(22) PCT Filed: Apr. 16, 2019

(86) PCT No.: PCT/US2019/027749
§ 371 (c)(1),
(2) Date: Jan. 31, 2020

(87) PCT Pub. No.: WO2019/204356
PCT Pub. Date: Oct. 24, 2019

(65) Prior Publication Data
US 2020/0366178 A1    Nov. 19, 2020

Related U.S. Application Data

(60) Provisional application No. 62/658,485, filed on Apr. 16, 2018.

(51) Int. Cl.
*H02K 5/24* (2006.01)
*H02K 37/22* (2006.01)
*H02K 37/04* (2006.01)

(52) U.S. Cl.
CPC .............. *H02K 37/22* (2013.01); *H02K 5/24* (2013.01); *H02K 37/04* (2013.01)

(58) Field of Classification Search
CPC ....................................................... H02K 5/24
See application file for complete search history.

(56) References Cited

U.S. PATENT DOCUMENTS

| 2,039,456 | A | 5/1936 | Sammarone |
| 6,512,314 | B1 | 1/2003 | Nakanishi |
| 2002/0047430 | A1 | 4/2002 | Iwasaki et al. |
| 2010/0156205 | A1 | 6/2010 | Davis et al. |
| 2010/0295389 | A1 | 11/2010 | Tessier et al. |

(Continued)

FOREIGN PATENT DOCUMENTS

| EP | 1313199 A2 | 5/2003 |
| GB | 823808 A | 11/1959 |

(Continued)

OTHER PUBLICATIONS

International Searching Authority, International Search Report, published by US/ISA dated Jul. 2, 2019.

*Primary Examiner* — Ramon M Barrera

(57) ABSTRACT

A switched reluctance machine exhibiting reduced noise and vibration, the machine comprising at least one rotor arranged to rotate about a central axis, the at least one rotor comprising a set of rotor poles arranged about the central axis; at least one stator positioned concentric to and radially outward from both the central axis and the at least one rotor, the at least one stator having an outer surface and an outer surface active zone; a housing having a sleeve positioned only radially outward from the stator outer surface active zone; at least one housing endplate coupled to an end of said housing; and wherein said stator has no direct connection to said housing.

38 Claims, 15 Drawing Sheets

(56) References Cited

U.S. PATENT DOCUMENTS

| | | |
|---|---|---|
| 2013/0193784 A1 | 8/2013 | Zheng |
| 2015/0357883 A1 | 12/2015 | Fairall et al. |
| 2016/0036291 A1 | 2/2016 | Yabe et al. |

FOREIGN PATENT DOCUMENTS

| | | |
|---|---|---|
| GB | 2293695 A | 4/1996 |
| JP | 59-189451 U | 12/1984 |
| JP | 2000217302 A | 8/2000 |

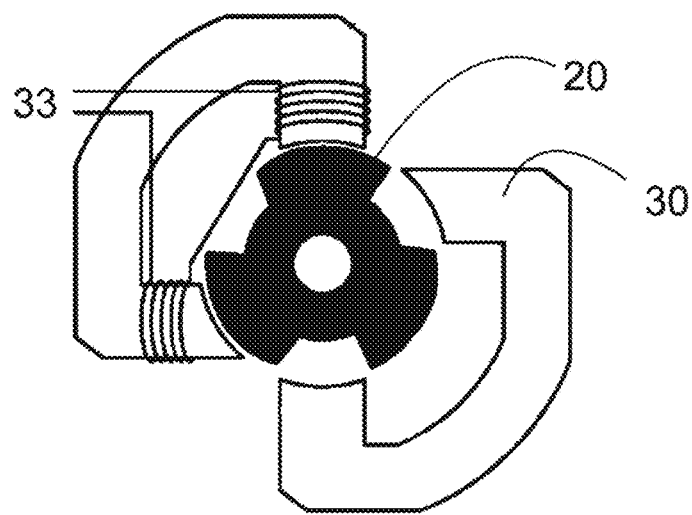
FIG. 1
(prior art)
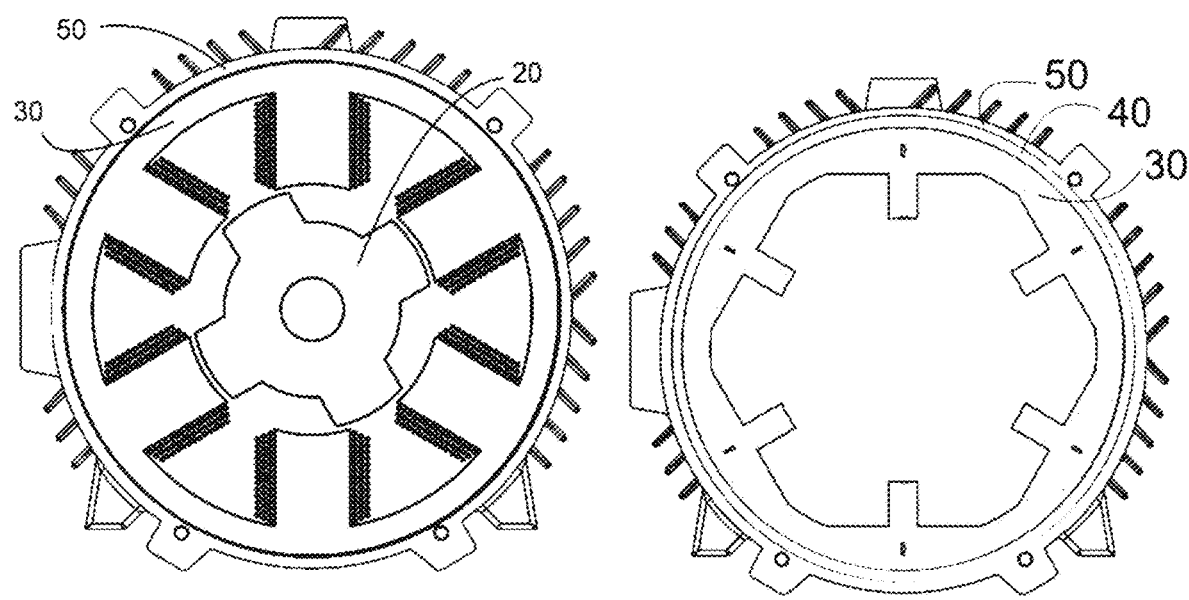
FIG. 2
(prior art)
FIG. 3

REDUCED NOISE AND VIBRATION SWITCHED RELUCTANCE MACHINE

RELATED APPLICATIONS

This application claims priority under 35 U.S.C. Section 371 to PCT Application PCT/US2019/027749, filed Apr. 16, 2019, which claims the benefit of provisional application with Ser. No. 62/658,485 and filed Apr. 16, 2018. The disclosure of that provisional application is incorporated herein as if set out in full.

BACKGROUND OF THE DISCLOSURE

Technical Field of the Disclosure

This invention relates generally to switched reluctance machines, and more particularly to a noise reduction method for a switched reluctance machine, and a switched reluctance machine exhibiting reduced noise verses conventional switched reluctance machines.

SUMMARY OF THE DISCLOSURE

A switched reluctance machine ("SRM") is a rotating electric machine and, due to its rugged and robust construction coupled with available fine motor control options, is a viable candidate for myriad generator and motor control applications. In an SRM, both stator and rotor have salient poles and power is delivered to windings in the stator, rather than the rotor as in conventional motors/generators. In operation, the SRM runs by reluctance torque, where rotor position is rotationally urged by voltage strokes and the accompanying magnetic communication between rotor and stator. In an SRM, the phase windings may be found on the stator, unlike the rotor which is unexcited and has no windings or permanent magnets mounted thereon. Rather, the rotor of an SRM is formed of a magnetically permeable material, typically iron, which attracts the magnetic flux produced by the windings on the stator poles when current is flowing therethrough.

Although an SRM may act as either a switched reluctance generator or switched reluctance motor, in motor form magnetic attraction to the stator causes the rotor to rotate when excitation to the stator phase windings is switched on and off in a sequential fashion in correspondence to the rotor position. In generator form, the load is switched to the coils in such a sequence to synchronize current flow with rotation.

While an SRM is in some ways simpler than a conventional motor because power need not be delivered to a rotating part, it is at the same time more complicated because power must be delivered to different windings at different times. A switching system, such as an electro-mechanical means such as commutators or analog or digital timing circuits are typically employed to accomplish this necessary fine control.

While the conventional SRM provides many advantages over conventionally configured electric motors and generators, SRMs in many cases exhibit high levels of torque ripple, which in practice leads to unacceptable levels of noise and vibration. In an SRM, when the stator windings are energized, the solid salient-pole rotor's magnetic reluctance creates a force that urges its rotation. As certain stator poles are energized, typically diametrically opposed, the rotor moves toward alignment with those poles. As this occurs, the poles are de-energized, and the next step of stator poles are energized. The forces acting on the rotor actually very slightly deform the rotor into something more similar to an elliptic cylinder. Although as a percentage of the whole, the deformation is very mild, it is sufficient to create waves within the housing which are then transferred through the motor output as measurable vibrations. The pressure waves further manifest themselves as measurable sound emanating from the motor casing.

Various means of minimizing torque ripple have been employed. Dampening and insulation may reduce audible noise and vibration. Most modern SRMs employ programmable logic controllers, and thus can precisely time phase activations to minimize nonrotational movement. Because the rotor position can be exactly known, specific controller technology can further reduce torque ripple when it occurs. However, noise and vibration still occur, typically appearing as physical shaking of the motor on its mounts, and noise energy emitted from the SRM housing.

Therefore, there is a need for an SRM exhibiting reduced noise and vibration through the isolation of its stator/rotor mechanisms.

To that end, it is a first objective of the present invention to provide an SRM comprising a gap between all or substantially all of the stator outer surface and all or substantially all of the housing radially outward from said surface.

It is a second objective of the present invention to provide an SRM wherein the stator/rotor mechanism is only supported by bridges connecting to housing endplates.

It is a third objective of the present invention to provide an SRM wherein the stator and rotor are maintained in alignment by means other than an SRM housing.

It is a further objective of the present invention to provide an SRM wherein the stator is mechanically connected to the housing only via an intermediate structure.

It is a still further objective of the present invention to provide an SRM wherein the stator and housing are not contiguous.

It is a still further objective of the present invention to provide an SRM wherein the stator is coupled to the housing only through a housing endplate.

It is a still further objective of the present invention to provide an SRM according to an alternative embodiment wherein the stator is radially inward from said rotor, which is not contiguous with the SRM housing.

The present embodiment overcomes shortcomings in the field by accomplishing these critical objectives.

To minimize the limitations found in the existing systems and methods, and to minimize other limitations that will be apparent upon the reading of this specification, the preferred embodiment of the present invention provides a method for reducing noise in a switched reluctance machine further provides for a related apparatus of a switched reluctance machine exhibiting reduced noise.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIG. 1 is a diagrammatic view of an SRM showing stators in phase and an associated rotor with two rotor poles aligned;

FIG. 2 is a diagrammatic cross sectional prior art image of a conventional SRM with certain elements shown removed for clarity;

FIG. 3 is a diagrammatic cross sectional view of the SRM according to the preferred embodiment, with certain elements shown removed for clarity;

DETAILED DESCRIPTION OF THE DRAWINGS

Figure 4:
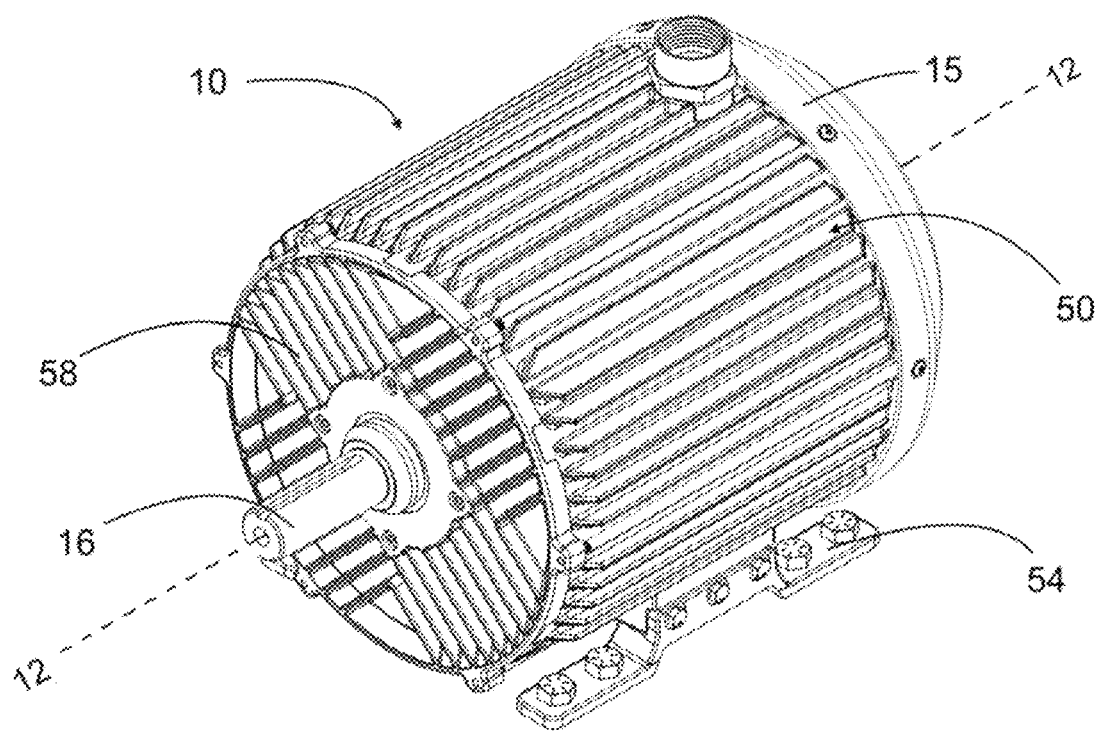
FIG. 4 is a front perspective view of an SRM exhibiting decreased noise in accordance with a preferred embodiment of the invention.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized, and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means+/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

A switched reluctance machine ("SRM") is a rotating electric machine generally having a configuration shown in its simplest form at prior art FIG. 1. Here, power is delivered to windings in the stator 30, and wherein rotor 20 position is rotationally urged by voltage strokes and the accompanying magnetic communication between rotor and stator. Phase 33 is depicted. The machine may be run either as a motor or in reverse as a generator, and although the apparatus may at times in this document be referred to as a motor, it is to be understood that in reverse the machine may be operated as a generator as well.

Prior art FIG. 2 depicts a diagrammatic end view of a conventional switched reluctance machine (SRM) with rotor and end cap removed for ease of viewing. This conventional machine shows a very small or no air gap between an outer surface of the stator 30 and an inner surface of the housing 50. As with many motors and generators, heat control is an important factor. To that end, for heat dissipation purposes conventional SRMs typically leave no space between stator and housing. A firm and direct connection of the two components allows the SRM housing to act as a heat sink for the stator/rotor combination. This is achieved by configuring the stator to fit tightly inside the housing.

Turning next to FIG. 3, an improved SRM according to an embodiment of the invention is shown in diagrammatic form. The SRM is provided with a space gap 40 between stator 30 and the housing 50 is shown. More detailed descriptions of the components involved may be found in the subsequent images and text related thereto. Although the gap is referred to here as a space gap, it need not necessarily be filled with air. Instead, as described in alternative embodiments of the invention, the gap may be filled with any noise and/or vibration dampening material, such as gel, or it may be filled with air or other gasses. The material within the gap need not be homologous, and in some alternative embodiments there may exist other material or additional circular rings, scaffolding, or structural supporting material. The additional materials would further reduce noise and/or provide support for the gel, structural assistance generally, ease of manufacturing, or improved heat dissipation. In any case, there is no direct mechanical connection between the stator and the housing segment (sleeve segment).

Figure 5:
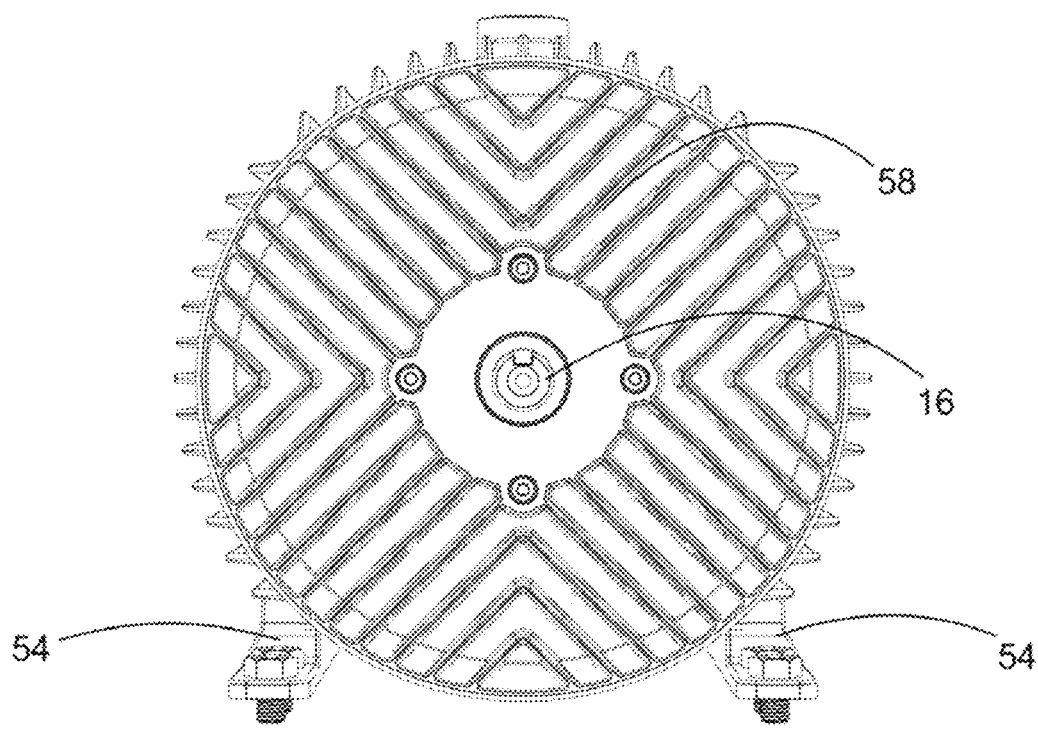
FIG. 5 is a front view of the SRM according to the preferred embodiment.
Figure 6:
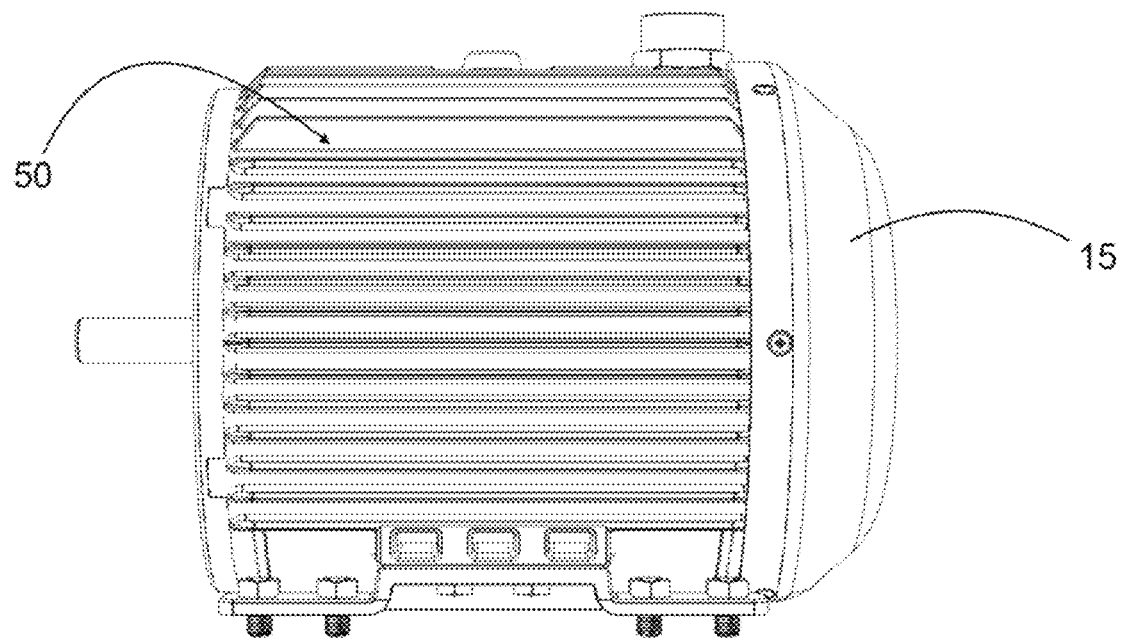
FIG. 6 is a right-side view of the SRM according to the preferred embodiment.
Figure 7:
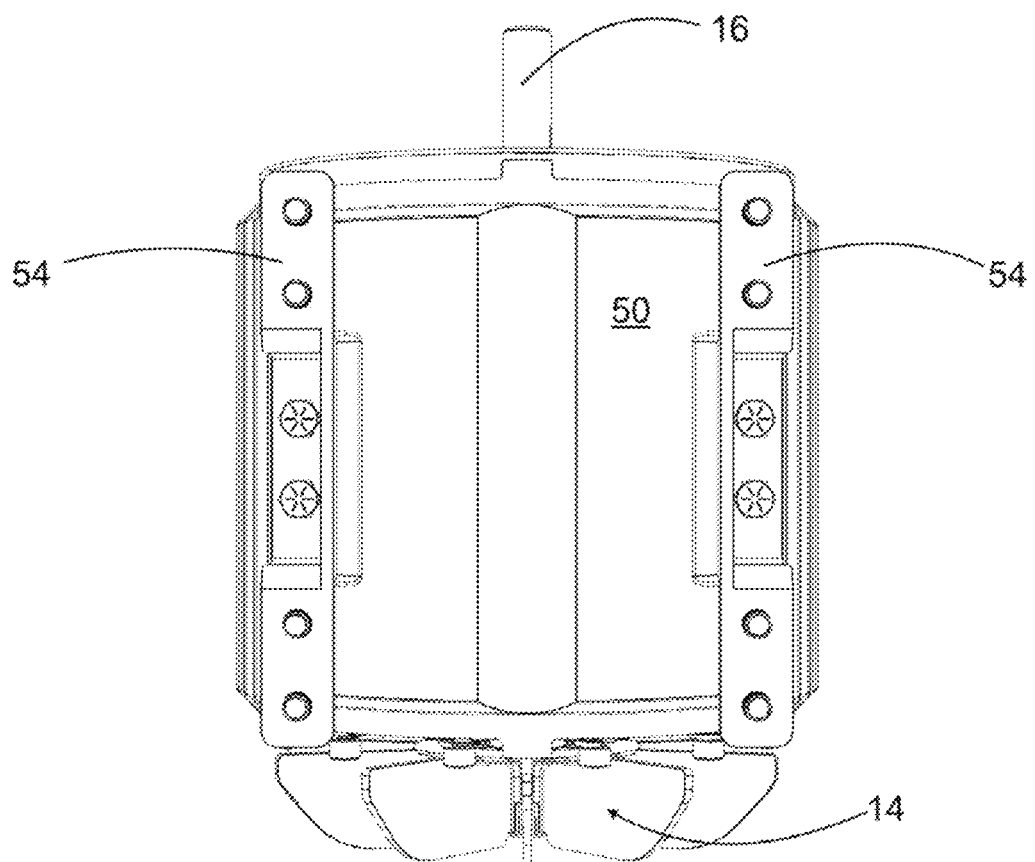
FIG. 7 is a bottom side view of the SRM according to the preferred embodiment and with the fan shroud shown removed.

FIGS. 3-15 depict an SRM 10 in accordance with a preferred embodiment of the invention. As shown in FIG. 4-6, the housing 50, feet 54, end cap 58 and fan shroud 15, along with other conventional features appear as they would on conventional SRMs. As shown in FIGS. 5 and 7, output shaft 16 rotates about central axis 12 as a result of operation of the motor, or when the machine is in generator mode output shaft 16 may conceptually be considered an input shaft. Feet 54 or other mounting features serve to anchor the SRM 10 to another object and to minimize its movement in relation thereto. Although they are shown on a middle portion of the housing, similar mounting features may be integral with or coupled to the housing end plates. As shown in FIGS. 4, 6 and 7, feet 54 comprise four fasteners each, however, any suitable means of coupling the SRM 10 to an external object are considered. FIG. 7 depicts the underside of the machine, wherein the fan shroud has been removed, exposing fan 14 insider. In a preferred embodiment, the improved SRM 10 is externally no different from conventional SRMs. This allows the improved SRM 10 to be installed in a plug and play fashion in lieu of a conventional SRM.

Figure 8:
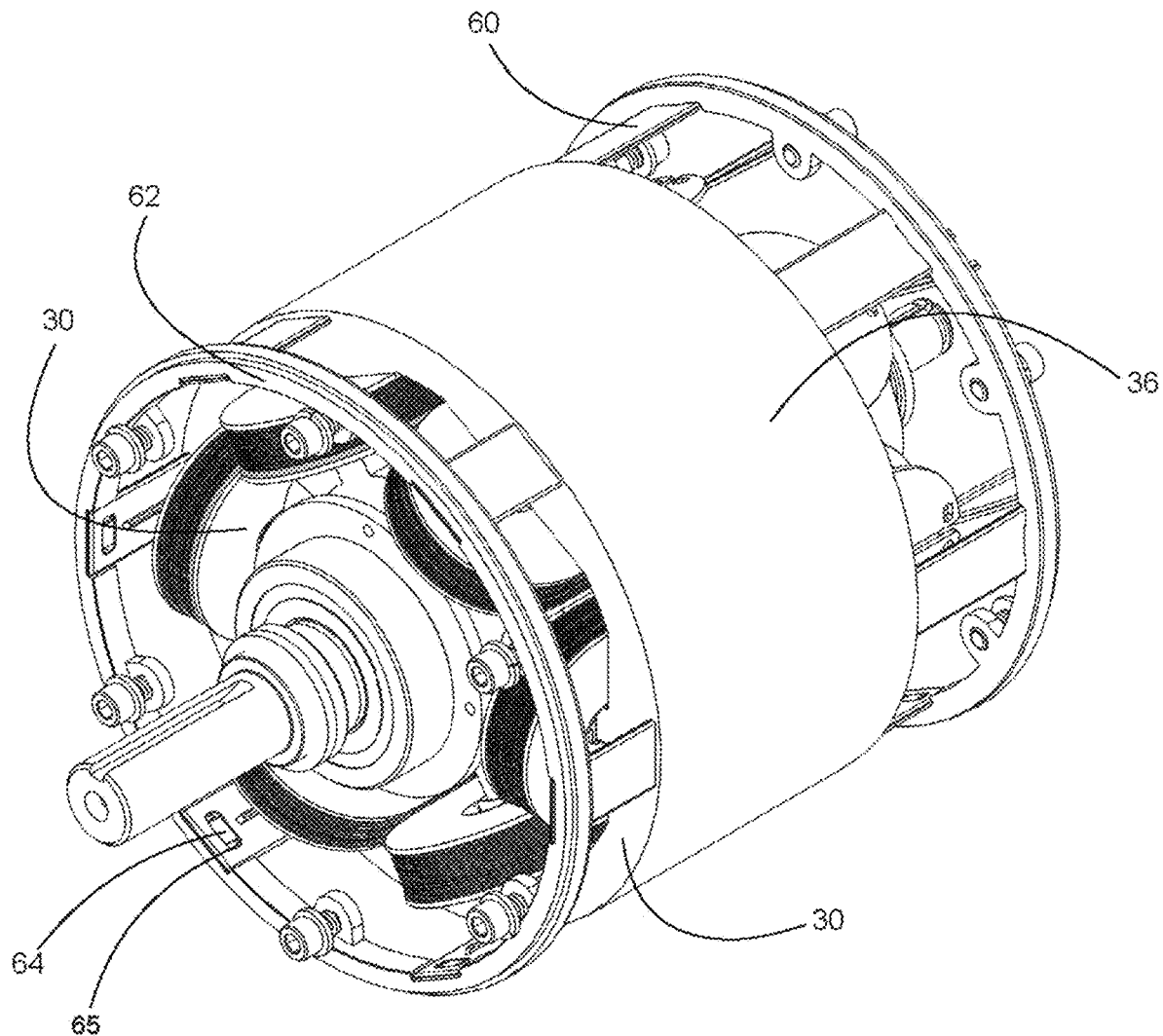
FIG. 8 is a front perspective view of the SRM according to the preferred embodiment wherein the housing, end plates, fan, fan shroud, and feet are removed.

FIG. 8 is a front perspective view wherein the inner workings of the machine are revealed by the removal of housing 50, feet 54, and housing end plates. In the preferred embodiment, the stator 30 is supported by a plurality of connecting bridges 60 that pass through the stator apertures 38 (see FIG. 12). Preferably, the ratio of connecting bridge to stator pole is 1:1, however, there may be fewer or greater numbers of either connecting bridges or stator poles. A pair of connecting bridge rings 62 at each end of the connecting bridge fit over connecting bridge retaining tabs 62 and are used to support the ends of the connecting bridges 60.

Connecting bridge ring 62 is mounted to housing front end plate 58 and the connecting ring at the rear of the machine (not labeled) is similarly coupled to the housing rear end plate (not labeled). Although various means known in the art for coupling components may be used, in the exemplary embodiment shown in FIG. 8, a connecting bridge retaining tab 65 on the connecting bridge ring accepts a connecting bridge aperture 65 on the connecting bridge 60.

Figures 9A, 9B, 10:
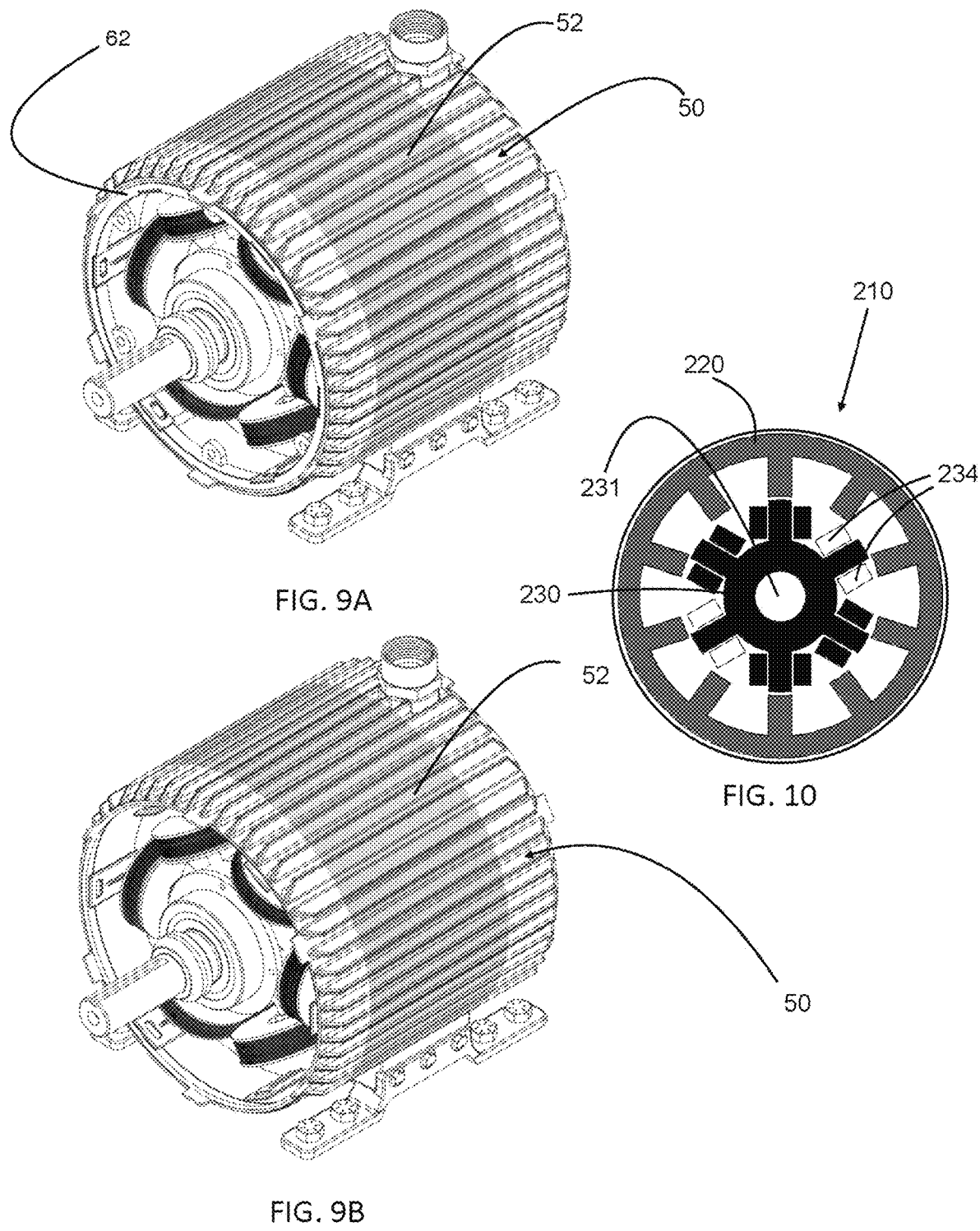
FIG. 9A is a front perspective view of the SRM according to the preferred embodiment wherein the end plates, fan, fan shroud, and feet are removed.
FIG. 9B is the same image depicted in FIG. 9A but wherein the sleeve portion of the housing is depicted as a darker area along the housing.
FIG. 10 is a diagrammatic cross sectional view of an alternative embodiment of the invention where the rotor is radially outward from the internal stator.

FIGS. 9A and 9B are front perspective views of the SRM according to the preferred embodiment but wherein end plates, fan, and fan shroud are shown removed. In FIG. 9A, the connecting bridge retaining ring 62 is in position, whereas in FIG. 9B the machine is shown with this component removed. The connecting ring in an example of an intermediate structure between support bridges and housing, however, other suitable means for coupling the components together may be employed.

Figure 15:
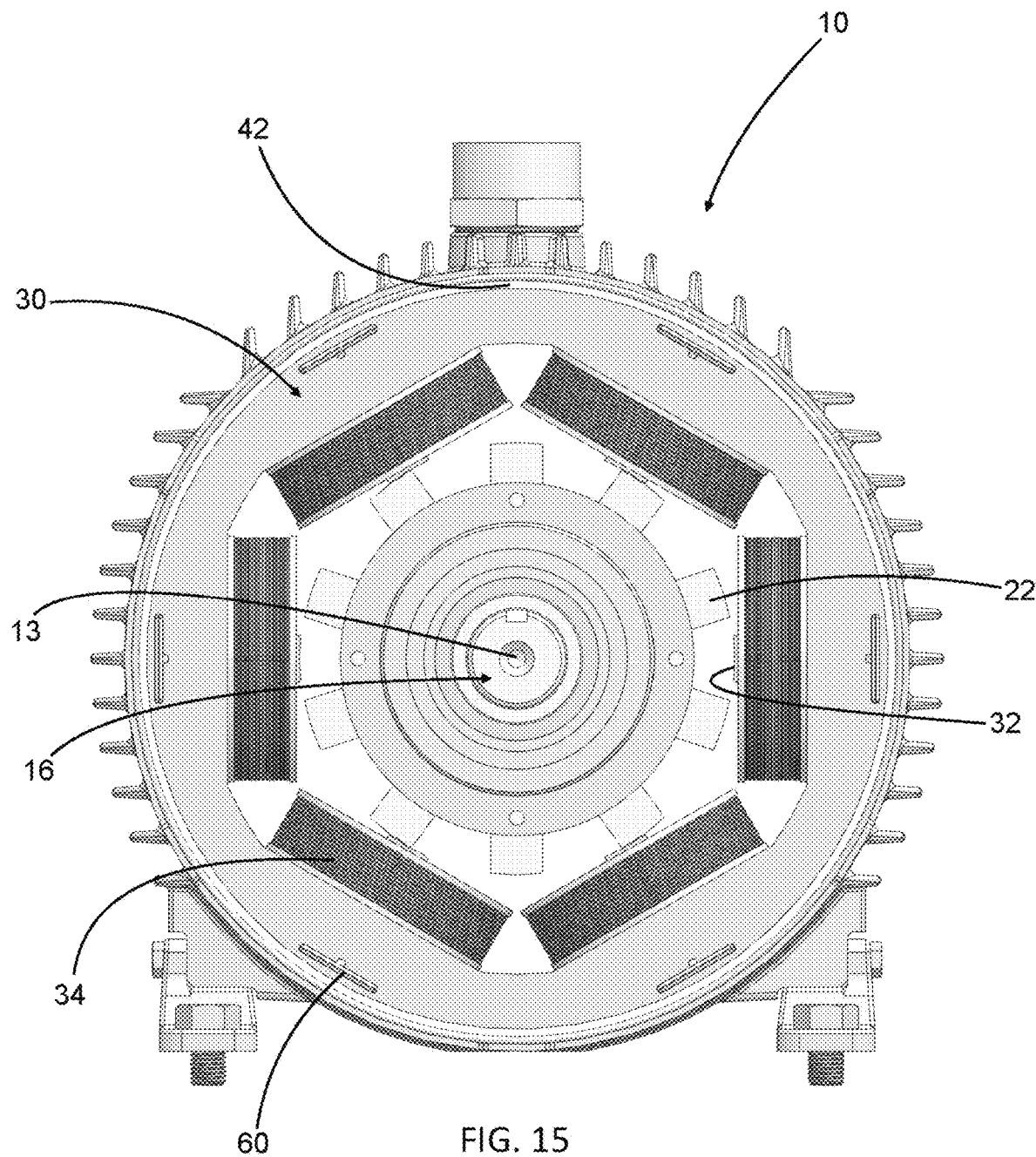
FIG. 15 is a front view of the SRM according to the preferred embodiment, and wherein end caps are removed for clarity.

Attention is now turned to FIG. 15, which is a front view of the SRM according to the preferred embodiment. Here, the rotor (not labeled) and a plurality of rotor poles 22 are shown positioned radially inward from said stator 30, which has its own stator poles 32. In use, rotor pole 22 is rotationally urged towards stator pole 32 upon the energization of a pair of windings 34. The rotor/stator combination are kept in alignment to one another by connecting bridges 60, but are also maintained separated from the housing, thus creating a gap that in this instance is an air gap 42. The gap need not be filled with air, and other materials such as other gasses, liquids, solids or semi-solids may be used.

Figure 11:
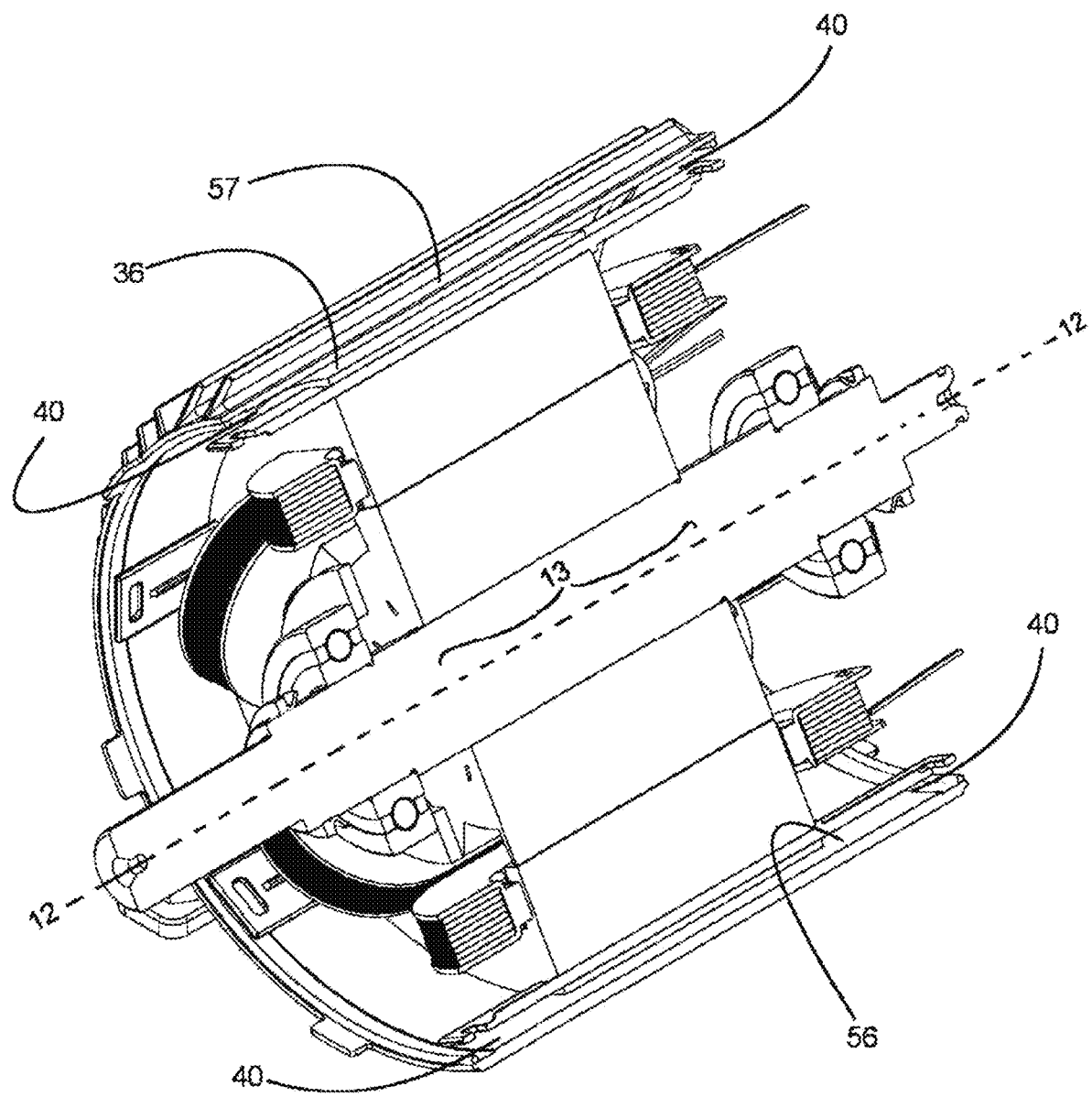
FIG. 11 is midline cross-sectional view of the SRM according to the preferred embodiment wherein housing end plates, fan, and fan shroud are shown removed.

FIG. 11 is a cross sectional view taken down the length of the machine. The central axis 12 is visible, as is that portion of the central axis 12 that passes through the stator/rotor combination, referred to here as central axis active portion 13. Extending radially outward from the active portion, one passes through rotor, then stator, then stator outer surface 36, then gap 40, then sleeve portion inner surface 56 and finally sleeve portion outer surface 57. The sleeve portions are a part of housing 50, not labelled here, and are not necessarily separate components. That is, the sleeve portion 52 (shown best at FIGS. 9A and 9B) is a zone of the housing 50 that corresponds to the central axis active portion 13 at its center. In FIGS. 9A and 9B this is depicted as a shaded area of the housing.

While in these images the sleeve portion is shown as roughly 60% of the length of the housing, it may in other instances occupy between 50-70% of the housing, less than 50% of the housing, or more than 70% the length of the housing. In some embodiments, the entire cylindrical portion of the housing is the sleeve and in still other embodiments at least 90% of the housing or at most 90% of the housing is a sleeve portion. In some embodiments, all space and components between central axis active portion 13 and the radially outward most areas of the machine may be considered active zone components, and the space considered an active zone. In that respect, the embodiment comprises each of the at least one rotor, at least one stator, and sleeve making up active zone components; an active zone extends between said active zone components; and a space gap filling substantially all of said active zone between said at least one stator and said sleeve, or in the case of certain embodiments (FIG. 10), between said at least one rotor and said sleeve.

Figure 13:
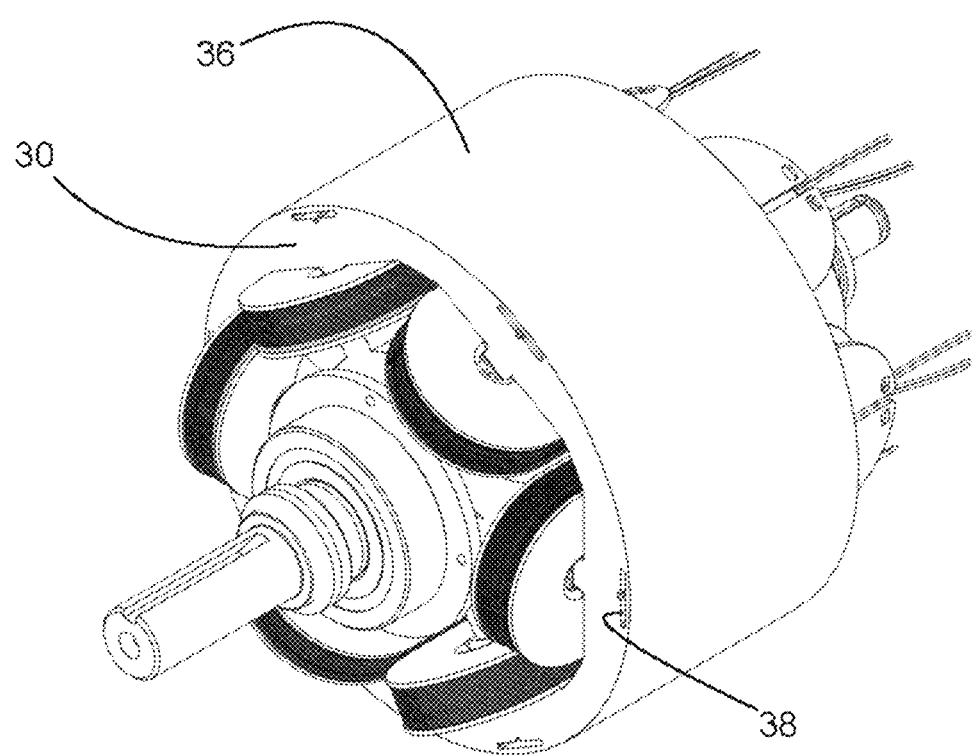
FIG. 13 is a front perspective view of the SRM where for clarity only rotor, stator and stator windings are depicted.
Figure 14:
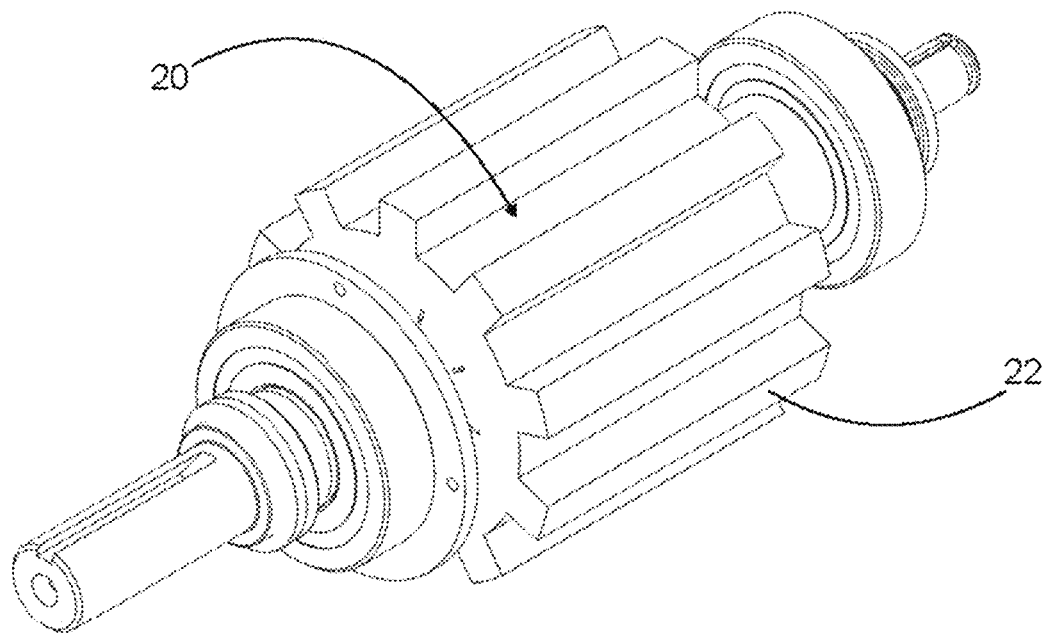
FIG. 14 is a front perspective view of a stator according to some embodiments of the present invention.

Sleeve portion 52 can be considered that portion radially outward from the stator/rotor combination, which is shown best in isolation at FIG. 13. Here, the stator 30 has an outer surface 36 that as should be apparent from the above description does not contact that portion of the housing radially outward from it. For purposes of completeness, FIG. 14 depicts a sample rotor 20 with its plurality of rotor poles 22. It should be noted that in other embodiments, such as that shown in FIG. 10, the location of these components may be switched. In diagrammatic FIG. 10, showing an alternative embodiment of the invention, SRM rotor 220 is positioned radially outward from the SRM stator 230. Stator windings/coils are identified at component 234 and the stator hub at 231. SRMs of this configuration are known in the art, however, the air gap shown just radially outward from the stator 220 is not.

Figure 22:
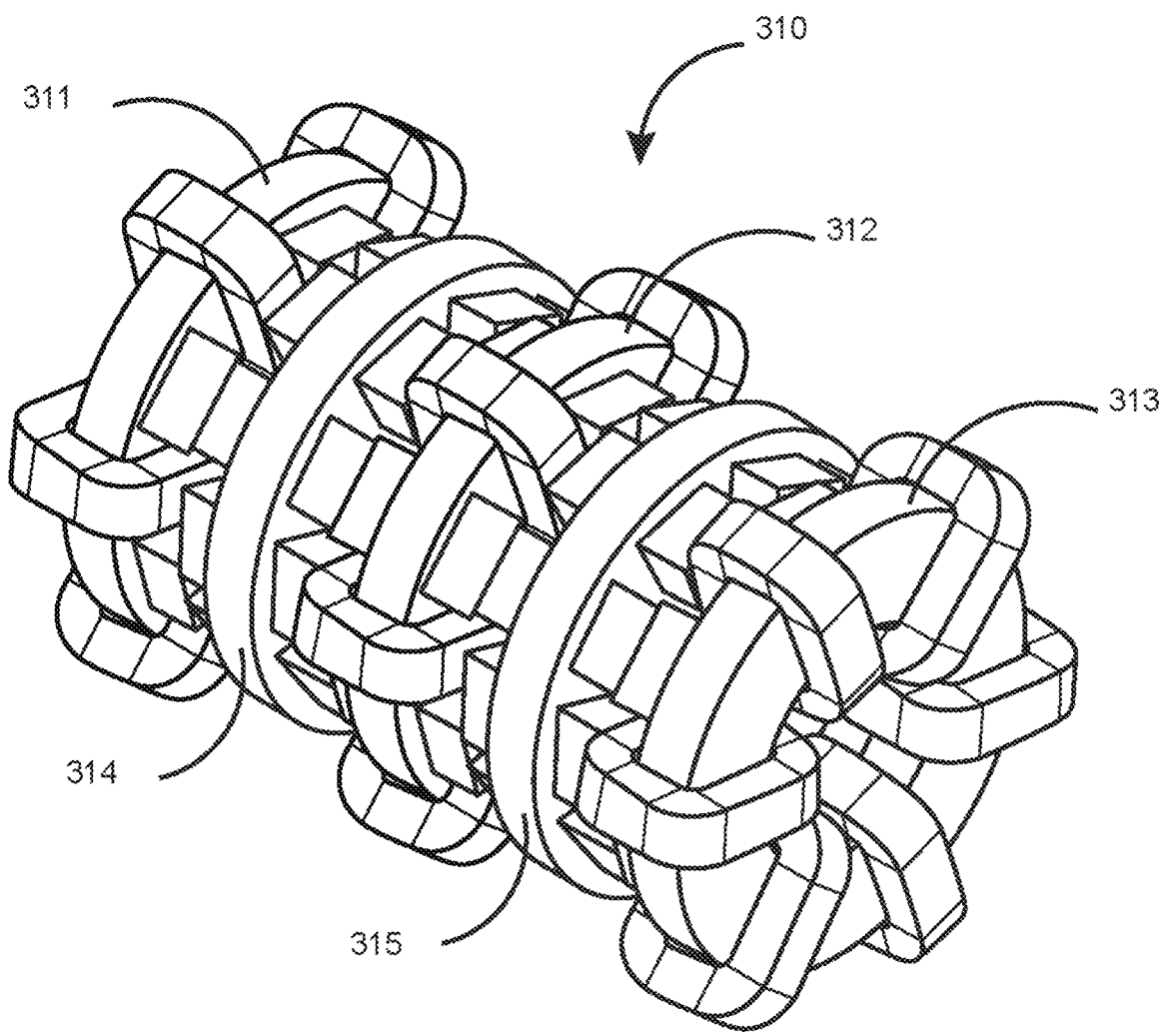
FIG. 22 is a multi-stator multi-rotor SRM according to some embodiments of the invention.

Still other embodiments, such as that shown in FIG. 22, are not incompatible with the present invention. FIG. 22 illustrates a perspective view of a multiple stator multiple rotor SRM 40 with an axial configuration having three stators 42, 44, 46 and two rotors 48, 50, all of which are radially inward of a housing (not shown). As with this case and any configuration, no part of the stator rotor stack is in direct physical communication with that portion of the housing (sleeve portion 52) radially outward from it. Said again, the stator outer surface 36 (FIG. 11) and the sleeve portion inner surface 56 are not in direct contact.

Figure 12:
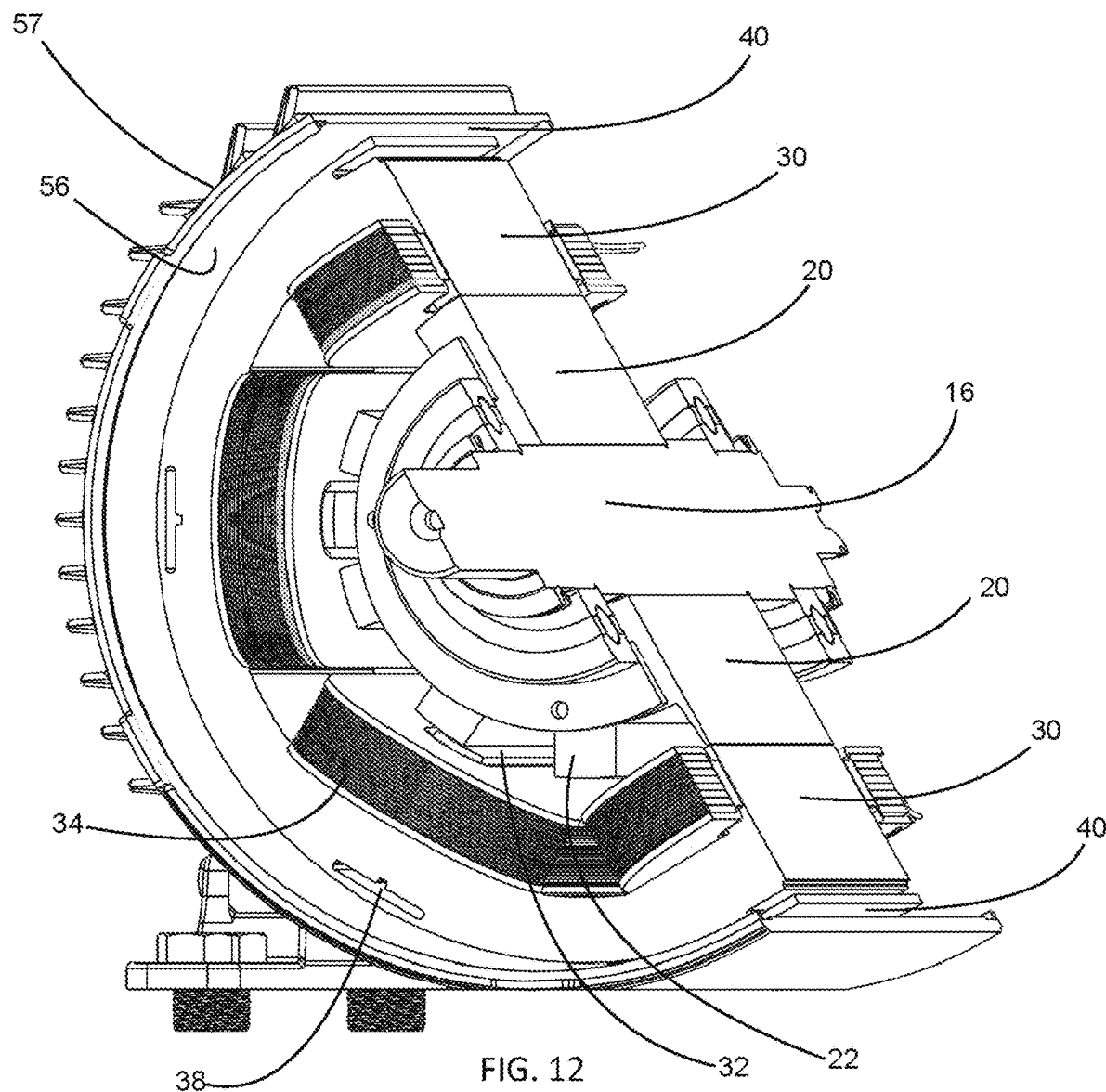
FIG. 12 is a rotated and closer view of the section shown in FIG. 11.

Turning now to FIG. 12, which is a rotated and zoomed view of the section shown in FIG. 11, it should become clear that stator outer surface 36 has a diameter that is smaller than the sleeve inner surface 56 of the housing 50, thus creating gap 40. The connecting bridges 60 are preferably made of aluminum and support the stator 30 while also providing a conduction path to the end plates (not shown). FIG. 12 shows at center the output shaft 16, followed by the rotor 20 radially outward, and then the stator 30 radially outward still. Gap 40 is present beyond the most radial point of either stator or rotor (see FIG. 10 wherein they are reversed). This image also shows stator apertures 38 where for clarity of understanding only, connecting bridges 60 are not threaded therethrough. As shown in other images, these connecting bridges may serve as an intermediate structure between stator/rotor and housing.

Figure 16:
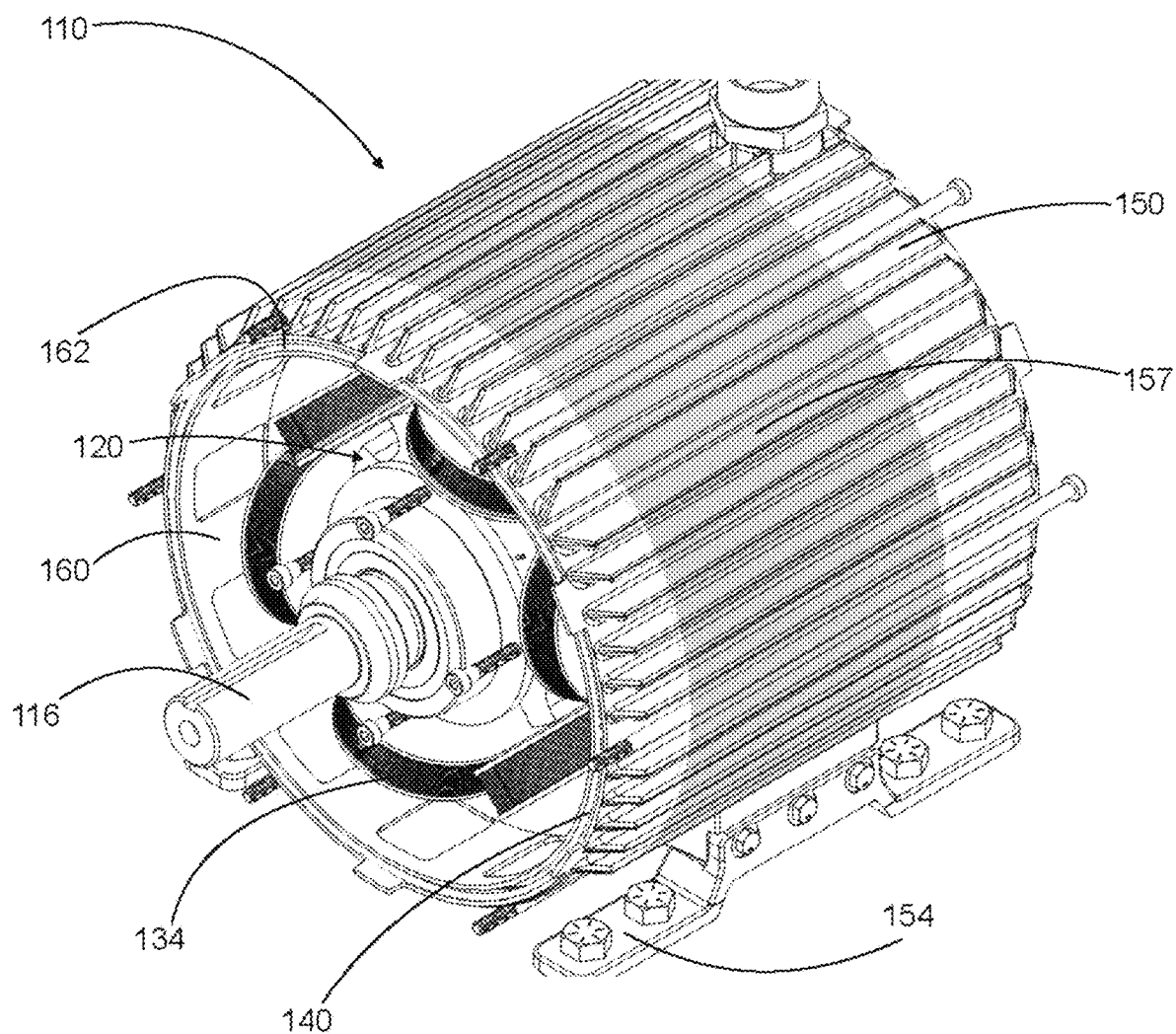
FIG. 16 is a partial perspective front view of an SRM according to an alternative embodiment of the invention, wherein housing end plates, fan, and fan shroud shown removed.

FIG. 16 is a perspective front view of an SRM 110 according to an alternative embodiment of the invention, wherein housing end plates 158 and 159, fan 114, and fan shroud 115 are shown removed for clarity. Most structures are common between all SRMs, such as output shaft 116, rotor 120, stator 130 with coils 134, and housing 150. In this embodiment, feet 154 are used to provide a tight connection of the SRM 110 to an external object (not shown).

In the alternative embodiment, the intermediate structure between stator and housing is support cylinder 160 that is supported by the end plates (not shown) at each end. The cylinder has an outer diameter (support cylinder outer surface 162) smaller than the housing inner diameter, thus creating gap 140. The cylinder is preferably made of aluminum, may be perforated for lightness, and supports the stator while also providing a conduction path to the end plates. This embodiment is also compatible with the alternative embodiments shown in FIGS. 10 and 22. Conceptually, the housing 150 in this alternative embodiment has a sleeve portion with a sleeve portion outer surface 157 and a sleeve portion inner surface (shown best at FIG. 20)

Figure 17A:
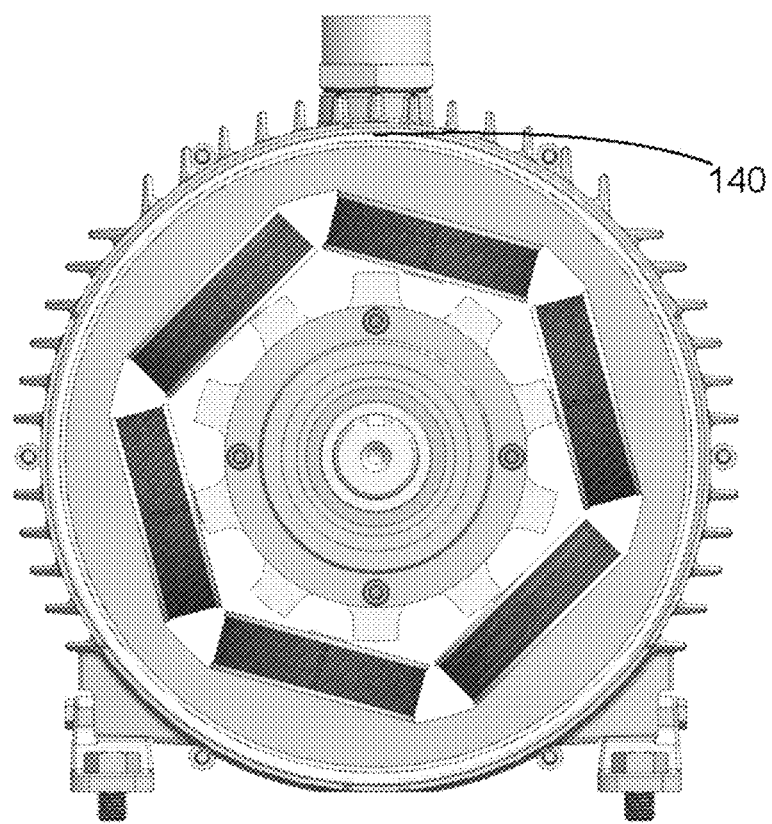
FIG. 17A is a front view of an SRM according to an alternative embodiment of the invention wherein the gap between stator support cylinder and the housing is clearly depicted.
Figure 17B:
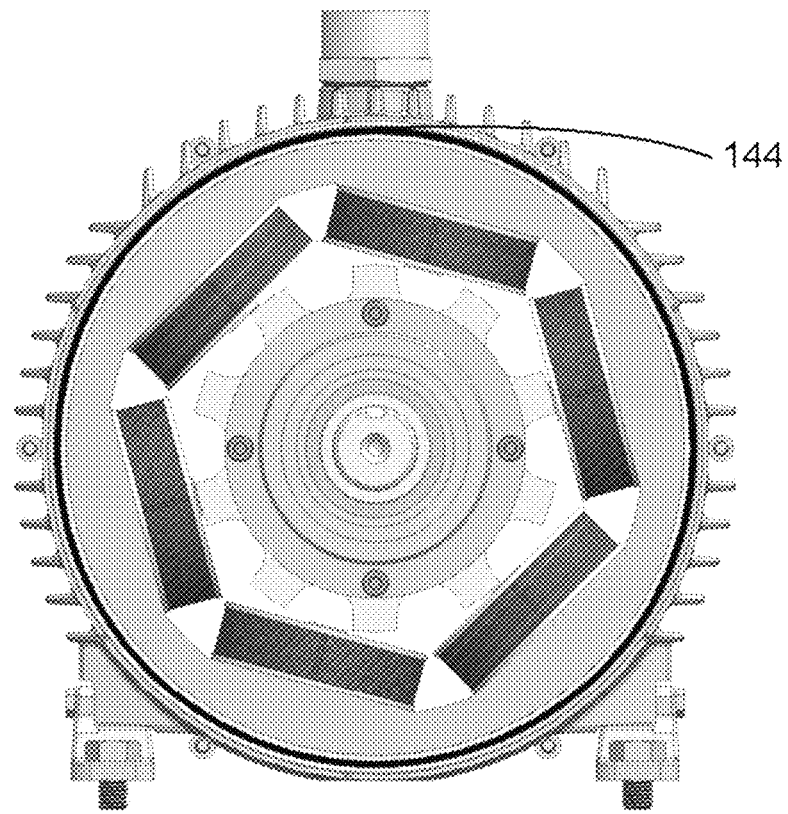
FIG. 17B is a front view of an SRM as shown in FIG. 17A but wherein the gap is filled with a non-gaseous vibration absorbing material.

As with all embodiments, a gap between the stator/rotor stack and the inner surface of the housing is included, as is shown best at FIGS. 17A and 17B. At FIG. 17A this gap is shown as an air gap 140, whereas FIG. 17B shows it filled with an absorptive material 144.

Figure 18:
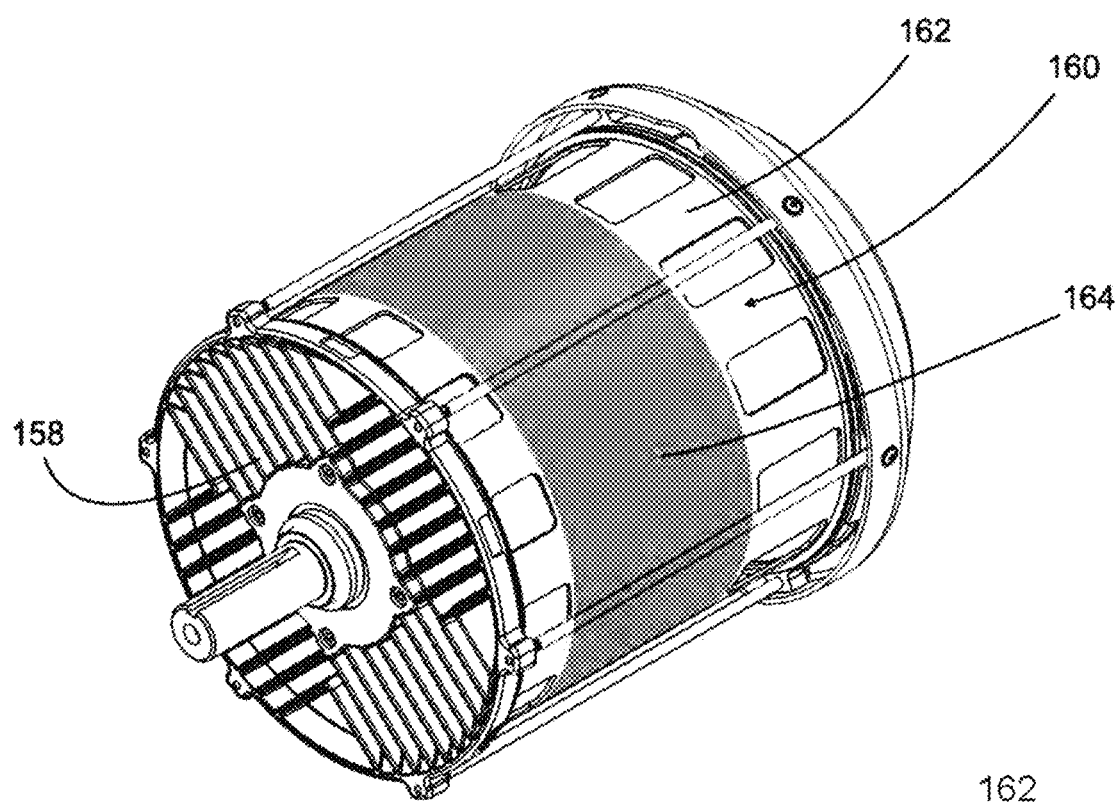
FIG. 18 is a front perspective view of an SRM according to an alternative embodiment of the invention, wherein the housing is shown removed for clarity.
Figure 19:
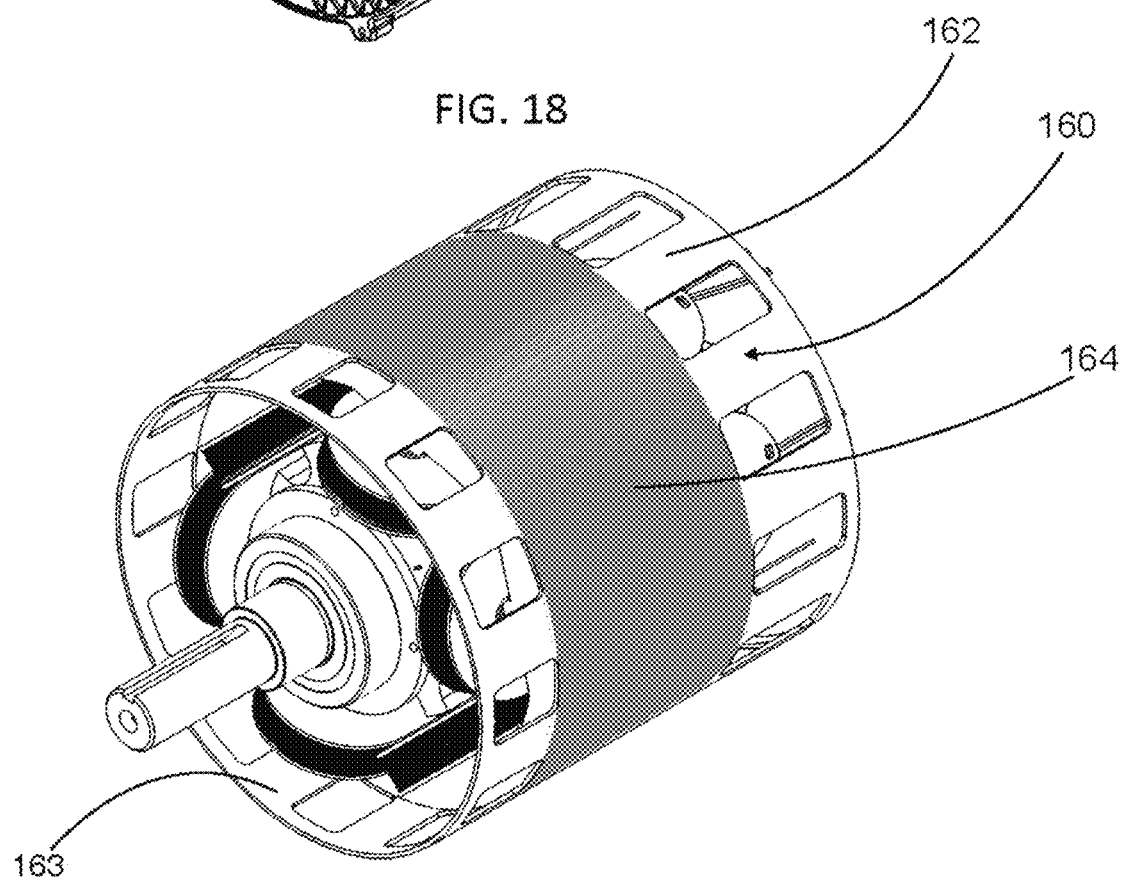
FIG. 19 is a front perspective view of an SRM according to an alternative embodiment of the invention, wherein housing and housing end plates are shown removed for clarity.
Figure 20:
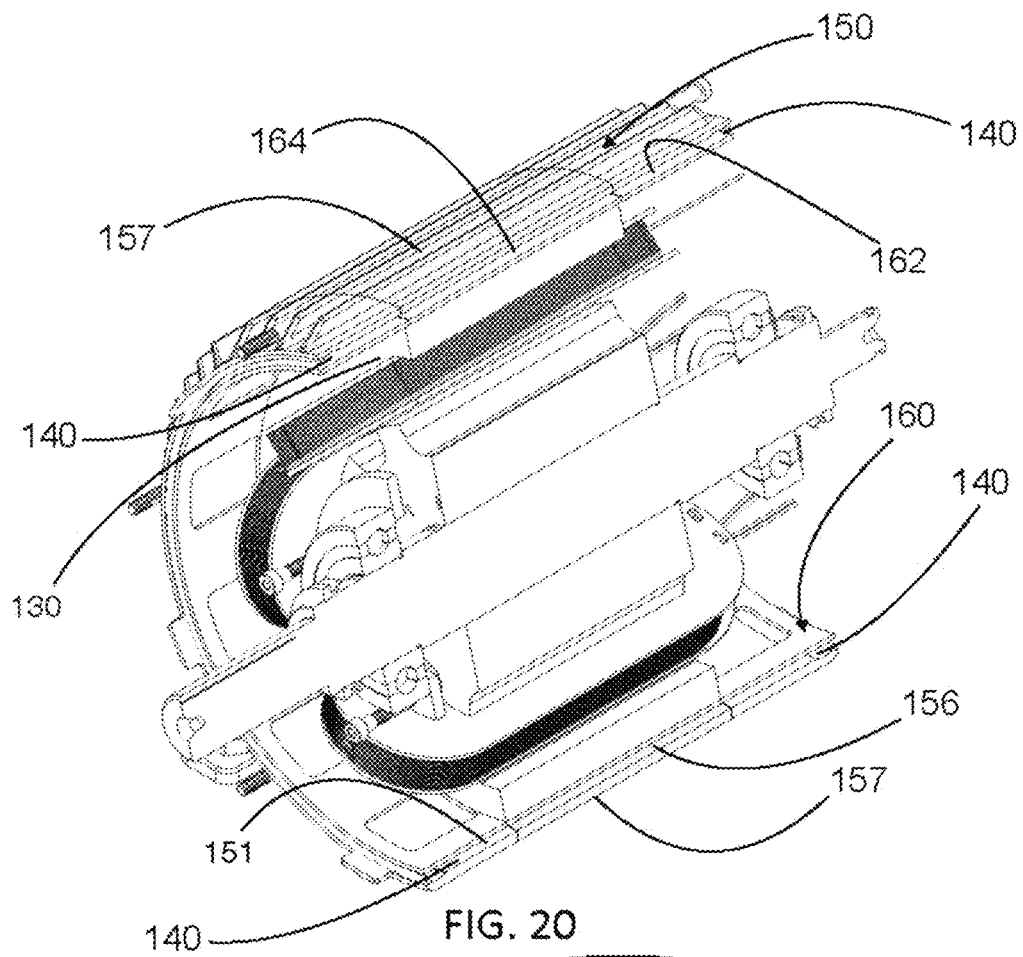
FIG. 20 is a midline cross-sectional view of the SRM wherein housing end plates, fan, and fan shroud are shown removed for clarity.
Figure 21:
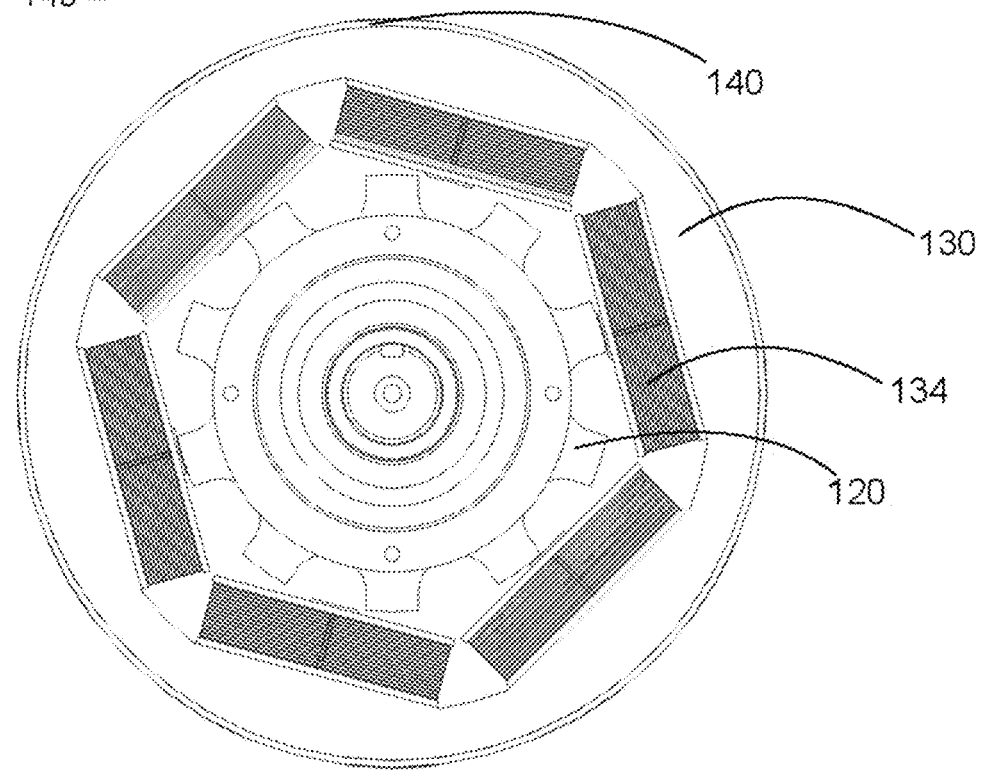
FIG. 21 is a cross sectional view of an alternative embodiment of the invention.

FIGS. 18 and 19 best show the support cylinder 160, along with its support cylinder outer surface 162 and support cylinder inner surface 163. The support cylinder 160 is coupled to an end cap 158 using conventional means. The sleeve portion shown with respect to the housing of this and other embodiments has an analogous component on the support cylinder. Radially inward from the sleeve portion (and radially outward from the central axis, and more specifically the central axis active portion (not labeled here)) running axially down the center of the machine, is a support cylinder sleeve zone 164. FIG. 20 is a midline cross-sectional view of the SRM 110 wherein housing end plate 158, and other components are shown removed for clarity. It is apparent from the viewing of this image that sleeve portion outer surface 157 is radially outward said stator support cylinder sleeve zone 164 and said stator 130. The support cylinder 160 has an outer surface 162 which forms the inner wall of gap 140. The outer wall of gap 140 is also depicted, here as housing inner surface 151. Where housing inner surface 151 overlaps with the stator/rotor combination, it may be referred to as sleeve portion inner surface 156. The portion of this on the outside of housing 150 is sleeve portion outer surface 157. For clarity, the components rotor 120, stator 130 (with stator windings 134) and air gap 140 are depicted again at FIG. 21.

In use, the improved SRM exhibits far less vibration and noise than conventional SRMs. Stator/rotor displacement, vibrations, and pressure waves are absorbed by the gap, gel, or other suitable material, gas and/or liquid within said gap. The stator/rotor combination is kept isolated from the housing sleeve segment radially outward of it, and the gap represents a region of noise/sound dampening around the stator/rotor. When the gap is filled with other materials, the filling may act as a further noise/sound dampening wrap, while maintaining effective heat dissipation properties enabling the switched reluctance machine to run thermally improved as compared to a conventional SRM.

While the description has not been specific to the type of SRM, in one embodiment the machine is a three-phase type as is well known in the art, and preferably in all embodiments an electrical control circuit as is well known in the art is operably attached to the windings of the stator poles. As is known conventionally, timing the energization of the windings is required for smooth operation of the SRM.

The invention may comprise in some embodiments a switched reluctance machine exhibiting reduced noise and vibration, the machine comprising a housing comprising a sleeve; a central axis comprising a central axis active portion; at least one rotor and at least one stator radially outward from said central axis, said stator comprising a stator outer surface having a stator outer surface; a gap between substantially all of said stator outer surface and said sleeve; and wherein the sleeve is radially outward from said gap, which is radially outward from said at least one stator, which is radially outward from said at least one rotor, which is radially outward from said central axis active portion.

In other embodiments, a switched reluctance machine exhibiting reduced noise and vibration is disclosed, the machine comprising at least one rotor arranged to rotate about a central axis, the at least one rotor comprising a set of rotor poles arranged about the central axis; at least one stator positioned concentric to and radially outward from both the central axis and the at least one rotor, the at least one stator comprising a set of stator poles in magnetic communication with the set of rotor poles and each having a winding, wherein at least two of said stator poles form a phase of the switched reluctance machine, and, when the phase is energized, at least one of the rotor poles aligns with a stator pole. The at least one stator further comprises a stator outer surface radially outward from said set of stator poles and having a stator outer surface, and the machine further comprises a housing comprising a sleeve portion having a sleeve inner surface and an outer sleeve surface, the sleeve located only radially outward from the stator outer surface.

In some embodiments the machine comprises a gap between substantially all of the stator outer surface and substantially all of said sleeve inner surface. In some embodiments the gap may be filled with a gas, such as air, or it may be filled with other non-gaseous vibration absorbing materials. The gap may exist between all of the stator outer surface and all of the sleeve inner surface, wherein the stator outer surface and sleeve inner surface are not contiguous.

In other embodiments the alignment between stators and rotors is maintained by a plurality of connecting bridges, and in other embodiments a plurality of connecting bridges supports said at least one stator within said sleeve. In certain of these embodiments the connecting bridges are the sole mechanical connection between said at least one stator and said sleeve. In certain others of these embodiments there is at least one connecting bridge and it is coupled to at least one housing end cap. In certain of these embodiments the at least one connecting bridge is perpendicular to the at least one housing end cap. In still other embodiments the ratio of windings to connecting bridges is 1:1, at least 1:1, or at most 1:1. In some embodiments the windings are radially aligned with said connecting bridges.

In certain other embodiments the stator is mechanically connected to the sleeve only via an intermediate structure. In certain of these, the machine further comprising a gap between substantially all said stator outer surface and the sleeve, and in some instances only the gap is between said stator outer surface and the sleeve.

In still further embodiments the stator and sleeve are not contiguous, the rotor and sleeve are not contiguous, the stator and no part of the housing is contiguous, and/or the rotor and no part of the housing is contiguous. In some embodiments the stator or rotor are not in direct connection with any part of the housing, but instead are in connection only via an intermediate object, such as a connecting bridge 60 or support cylinder 160. In still further embodiments the stator is in connection with said sleeve only through said at least one endplate and said connecting bridges. Thus, there is no direct connection, and instead only a connection via some intermediate structure.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

We claim:

1. A switched reluctance machine exhibiting reduced noise and vibration, the machine comprising:
   a. at least one rotor arranged to rotate about a central axis, the at least one rotor comprising a set of rotor poles arranged about the central axis;
   b. at least one stator positioned concentric to and radially outward from both the central axis and the at least one rotor, the at least one stator comprising:
      i. a set of stator poles in magnetic communication with the set of rotor poles and each having a winding;
      ii. wherein at least two of said stator poles form a phase of the switched reluctance machine, and, when the phase is energized, at least one of the rotor poles aligns with a stator pole; and
      iii. a stator outer surface radially outward from said set of stator poles and having a stator outer surface;
   c. a housing comprising a sleeve portion having a sleeve inner surface and an outer sleeve surface, the sleeve located only radially outward from the stator outer surface;
   d. a gap between substantially all of the stator outer surface and substantially all of said sleeve inner surface, the gap represents a region of noise dampening around the stator and the rotor;
   e. a plurality of connecting bridges designed to keep rotor/stator combination in alignment to one another and maintains the rotor/stator combination separated from the housing thereby creating the gap; and
   f. a pair of connecting bridge rings at each end of the plurality of connecting bridges, the pair of connecting bridge rings includes connecting bridge retaining tabs designed to accept connecting bridge apertures on the connecting bridges.

2. The switched reluctance machine of claim 1 wherein the gap is substantially filled with air.

3. The switched reluctance machine of claim 1 wherein the gap is substantially filled with a non-gaseous vibration absorbing material.

4. The switched reluctance machine of claim 1 where the gap is between all of the stator outer surface and all of the sleeve inner surface, and wherein the stator outer surface and sleeve inner surface are not contiguous.

5. The switched reluctance machine of claim 1 wherein the machine is a three-phase type.

6. The switched reluctance machine of claim 1 further comprising an electrical control circuit operably attached to the windings of the stator poles.

7. A switched reluctance machine exhibiting reduced noise and vibration, the machine comprising:
   a. at least one rotor arranged to rotate about a central axis, the at least one rotor comprising a set of rotor poles arranged about the central axis;
   b. at least one stator positioned concentric to and radially outward from both the central axis and the at least one rotor, the at least one stator comprising:
      i. a set of stator poles in magnetic communication with the set of rotor poles and each having a winding;
      ii. wherein at least two of said stator poles form a phase of the switched reluctance machine, and, when the phase is energized, at least one of the rotor poles aligns with a stator pole; and
      iii. a stator outer surface radially outward from said set of stator poles and having a stator outer surface;
   c. a housing comprising a sleeve positioned only radially outward from the stator outer surface;
   d. a gap between substantially all of the stator outer surface and the sleeve, the gap represents a region of noise dampening around the stator and the rotor;
   e. a plurality of connecting bridges designed to keep rotor/stator combination in alignment to one another and maintains the rotor/stator combination separated from the housing thereby creating the gap; and
   f. a pair of connecting bridge rings at each end of the plurality of connecting bridges, the pair of connecting bridge rings includes connecting bridge retaining tabs designed to accept connecting bridge apertures on the connecting bridges.

8. The switched reluctance machine of claim 7 wherein the ratio of windings to connecting bridges is 1:1.

9. The switched reluctance machine of claim 8 wherein the windings are radially aligned with said connecting bridges.

10. The switched reluctance machine of claim 7 wherein only the gap is between the stator outer surface and the sleeve.

11. The switched reluctance machine of claim 7 wherein the gap is substantially filled with air.

12. The switched reluctance machine of claim 7 wherein the gap is substantially filled with a non-gaseous vibration absorbing material.

13. The switched reluctance machine of claim 7 wherein the connecting bridge is coupled to at least one housing end cap.

14. The switched reluctance machine of claim 13 wherein the connecting bridge is generally perpendicular to the at least one housing end cap.

15. The switched reluctance machine of claim 7 wherein the machine is a three-phase type.

16. The switched reluctance machine of claim 7 further comprising an electrical control circuit operably attached to the windings of the stator poles.

17. A switched reluctance machine exhibiting reduced noise and vibration, the machine comprising:
   a. at least one rotor arranged to rotate about a central axis, the at least one rotor comprising a set of rotor poles arranged about the central axis;
   b. at least one stator positioned concentric to and radially outward from both the central axis and the at least one rotor, the at least one stator comprising:
      i. a set of stator poles in magnetic communication with the set of rotor poles and each having a winding;
      ii. wherein at least two of said stator poles form a phase of the switched reluctance machine, and, when the phase is energized, at least one of the rotor poles aligns with a stator pole; and
      iii. a stator outer surface radially outward from said set of stator poles and having a stator outer surface;
   c. a housing having a sleeve positioned only radially outward from the stator outer surface;
   d. wherein the stator is mechanically connected to the sleeve only via an intermediate structure;
   e. a gap between substantially all said stator outer surface and the sleeve, the gap represents a region of noise dampening around the stator and the rotor;
   f. a plurality of connecting bridges designed to keep rotor/stator combination in alignment to one another and maintains the rotor/stator combination separated from the housing thereby creating the gap; and
   g. a pair of connecting bridge rings at each end of the plurality of connecting bridges, the pair of connecting bridge rings includes connecting bridge retaining tabs designed to accept connecting bridge apertures on the connecting bridges.

18. The switched reluctance machine of claim 17 wherein only the gap is between said stator outer surface and the sleeve.

19. The switched reluctance machine of claim 17 wherein the gap is substantially filled with air.

20. The switched reluctance machine of claim 17 wherein the gap is substantially filled with a non-gaseous vibration absorbing material.

21. The switched reluctance machine of claim 17 wherein the machine is a three-phase type.

22. The switched reluctance machine of claim 17 further comprising an electrical control circuit operably attached to the windings of the stator poles.

23. A switched reluctance machine exhibiting reduced noise and vibration, the machine comprising:
   a. at least one rotor arranged to rotate about a central axis, the at least one rotor comprising a set of rotor poles arranged about the central axis;
   b. at least one stator positioned concentric to and radially outward from both the central axis and the at least one rotor, the at least one stator comprising:
      i. a set of stator poles in magnetic communication with the set of rotor poles and each having a winding;
      ii. wherein at least two of said stator poles form a phase of the switched reluctance machine, and, when the phase is energized, at least one of the rotor poles aligns with a stator pole; and
      iii. a stator outer surface radially outward from said set of stator poles and having a stator outer surface;
   c. a housing having a sleeve positioned only radially outward from the stator outer surface;
   d. wherein stator and sleeve are not contiguous;
   e. a gap between the at least one stator and the sleeve, the gap represents a region of noise dampening around the stator and the rotor,
   f. a plurality of connecting bridges designed to keep rotor/stator combination in alignment to one another and maintains the rotor/stator combination separated from the housing thereby creating the gap; and
   g. a pair of connecting bridge rings at each end of the plurality of connecting bridges, the pair of connecting bridge rings includes connecting bridge retaining tabs designed to accept connecting bridge apertures on the connecting bridges.

24. The switched reluctance machine of claim 23 wherein the gap is between substantially all of said stator outer surface and the sleeve.

25. The switched reluctance machine of claim 24 wherein the gap is substantially filled with air.

26. The switched reluctance machine of claim 24 wherein the gap is substantially filled with a non-gaseous vibration absorbing material.

27. The switched reluctance machine of claim 23 wherein the machine is a three-phase type.

28. The switched reluctance machine of claim 23 further comprising an electrical control circuit operably attached to the windings of the stator poles.

29. A switched reluctance machine exhibiting reduced noise and vibration, the machine comprising:
   a. at least one rotor arranged to rotate about a central axis, the at least one rotor comprising a set of rotor poles arranged about the central axis;
   b. at least one stator positioned concentric to and radially outward from both the central axis and the at least one rotor, the at least one stator comprising:
      i. a set of stator poles in magnetic communication with the set of rotor poles and each having a winding;
      ii. wherein at least two of said stator poles form a phase of the switched reluctance machine, and, when the phase is energized, at least one of the rotor poles aligns with a stator pole; and
      iii. a stator outer surface radially outward from said set of stator poles and having a stator outer surface;
   c. a housing having a sleeve positioned only radially outward from the stator outer surface;
   d. at least one housing endplate coupled to an end of said housing;
   e. wherein said stator is in connection with said sleeve only through said at least one endplate;
   f. a gap between the at least one stator and the sleeve, the gap represents a region of noise dampening around the stator and the rotor;
   g. a plurality of connecting bridges designed to keep rotor/stator combination in alignment to one another and maintains the rotor/stator combination separated from the housing thereby creating the gap; and
   h. a pair of connecting bridge rings at each end of the plurality of connecting bridges, the pair of connecting bridge rings includes connecting bridge retaining tabs designed to accept connecting bridge apertures on the connecting bridges.

30. The switched reluctance machine of claim 29 wherein the machine is a three-phase type.

31. The switched reluctance machine of claim 29 further comprising an electrical control circuit operably attached to the windings of the stator poles.

32. A switched reluctance machine exhibiting reduced noise and vibration, the machine comprising:
  a. a housing comprising a sleeve;
  b. a central axis comprising a central axis active portion;
  c. at least one rotor and at least one stator radially outward from said central axis, said stator comprising a stator outer surface having a stator outer surface wherein each of the at least one rotor, at least one stator, and sleeve make up active zone components, and wherein an active zone extends between said active zone components, wherein;
  d. a gap between substantially all of said stator outer surface and said sleeve, the gap represents a region of noise dampening around the stator and the rotor, and wherein said gap fills substantially all of said active zone between said at least one stator and said sleeve;
  e. a plurality of connecting bridges designed to keep rotor/stator combination in alignment to one another and maintains the rotor/stator combination separated from the housing thereby creating the gap; and
  f. a pair of connecting bridge rings at each end of the plurality of connecting bridges, the pair of connecting bridge rings includes connecting bridge retaining tabs designed to accept connecting bridge apertures on the connecting bridges; and
  g. wherein the sleeve is radially outward from said gap, and only said sleeve and gap are radially outward from said at least one stator, which is radially outward from said at least one rotor, which is radially outward from said central axis active portion.

33. The switched reluctance machine of claim 32 wherein said gap is substantially filled with air.

34. The switched reluctance machine of claim 32 wherein said gap is substantially filled with a non-gaseous vibration absorbing material.

35. The switched reluctance machine of claim 32 wherein said gap occupies all of the space between the at least one stator and the sleeve.

36. The switched reluctance machine of claim 32, further comprising:
  a. a set of rotor poles on said at least one rotor;
  b. a set of stator poles in magnetic communication with the set of rotor poles and each having a winding; and
  c. wherein at least two stator poles form a phase of the switched reluctance machine, and, when the phase is energized, at least one of the rotor poles aligns with a stator pole.

37. The switched reluctance machine of claim 32 wherein the machine is a three-phase type.

38. The switched reluctance machine of claim 32 further comprising an electrical control circuit operably attached to the windings of the stator poles.

* * * * *